United States Patent
Yang et al.

(10) Patent No.: US 12,522,253 B2
(45) Date of Patent: Jan. 13, 2026

(54) VEHICLE CONTROL APPARATUS AND VEHICLE CONTROL METHOD

(71) Applicants: Hyundai Motor Company, Seoul (KR); Kia Corporation, Seoul (KR)

(72) Inventors: Seok Youl Yang, Incheon (KR); Beom Jun Kim, Seoul (KR); Sung Min Park, Seoul (KR); Rosali Sun Pyun, Seongnam-si (KR)

(73) Assignees: Hyundai Motor Company, South (KR); Kia Corporation, Seoul (KR)

( * ) Notice: Subject to any disclaimer, the term of this patent is extended or adjusted under 35 U.S.C. 154(b) by 475 days.

(21) Appl. No.: 17/948,747

(22) Filed: Sep. 20, 2022

(65) Prior Publication Data
US 2023/0303127 A1    Sep. 28, 2023

(30) Foreign Application Priority Data

Mar. 24, 2022  (KR) .................. 10-2022-0036904

(51) Int. Cl.
*B60W 60/00*    (2020.01)
*B60W 50/14*    (2020.01)

(52) U.S. Cl.
CPC ........ *B60W 60/0053* (2020.02); *B60W 50/14* (2013.01); *B60W 60/001* (2020.02); *B60W 2520/06* (2013.01); *B60W 2552/10* (2020.02); *B60W 2552/53* (2020.02); *B60W 2556/40* (2020.02)

(58) Field of Classification Search
None
See application file for complete search history.

(56) References Cited

U.S. PATENT DOCUMENTS

| | | | |
|---|---|---|---|
| 9,880,558 B2 | 1/2018 | Nakamura | |
| 10,399,571 B2 | 9/2019 | Goto et al. | |
| 10,974,722 B2 | 4/2021 | Miura et al. | |
| 2016/0259338 A1 | 9/2016 | Nakamura | |
| 2017/0192437 A1* | 7/2017 | Bier | G05D 1/0278 |
| 2018/0237019 A1 | 8/2018 | Goto et al. | |
| 2020/0247413 A1* | 8/2020 | Fukuda | B60W 30/10 |
| 2020/0307579 A1* | 10/2020 | Mizoguchi | B62D 15/0255 |
| 2022/0388515 A1* | 12/2022 | Carlson | B60W 10/20 |

FOREIGN PATENT DOCUMENTS

| | | |
|---|---|---|
| JP | 6269534 B2 | 1/2018 |
| JP | 6869534 B2 | 1/2018 |
| JP | 6559453 B2 | 8/2019 |

* cited by examiner

*Primary Examiner* — Navid Z. Mehdizadeh
*Assistant Examiner* — Jason R Roberson
(74) *Attorney, Agent, or Firm* — Slater Matsil, LLP

(57) ABSTRACT

An embodiment apparatus for controlling a vehicle includes a sensor configured to acquire surrounding information of the vehicle, a location acquisition device configured to acquire location information of the vehicle, and a controller configured to generate an autonomous driving route based on the surrounding information of the vehicle when it is determined that the vehicle is located within an operational design domain based on the location information of the vehicle, determine a first candidate lane capable of autonomous driving based on a lane width of a diverging lane and an inter-lane distance when there is at least one diverging lane, and generate the autonomous driving route based on the first candidate lane.

20 Claims, 7 Drawing Sheets

VEHICLE CONTROL APPARATUS AND VEHICLE CONTROL METHOD

CROSS-REFERENCE TO RELATED APPLICATIONS

This application claims the benefit of Korean Patent Application No. 10-2022-0036904, filed on Mar. 24, 2022, which application is hereby incorporated herein by reference.

TECHNICAL FIELD

The present disclosure relates to a vehicle control apparatus and a vehicle control method.

BACKGROUND

An autonomous driving vehicle refers to a vehicle capable of self-driving, which follows a route that is actively determined based on information about the vehicle's surroundings and vehicle status or arrives at a set target point with little or no driver intervention.

Recently, the performance and safety of autonomous driving vehicles are checked according to levels of autonomous driving, and the levels of autonomous driving may be classified into a Level 0 vehicle with no automation to a Level 5 vehicle with full automation.

Level 3 and Level 4 vehicles are associated with an Operational Design Domain (odd), and autonomous driving is possible only within the operational design domain. However, when a diverging lane exists within the operational design domain, it is difficult to ensure driving stability and driving continuity.

SUMMARY

Embodiments of the present disclosure can solve problems occurring in the prior art while advantages achieved by the prior art are maintained intact.

An embodiment of the present disclosure provides a vehicle control apparatus and method for generating a route capable of autonomous driving in a diverging lane within an operational design domain.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a vehicle control apparatus includes a sensor that acquires surrounding information of a vehicle, a location acquisition device that acquires location information of the vehicle, and a controller that generates an autonomous driving route based on the surrounding information of the vehicle when it is determined that the vehicle is located within an operational design domain based on the location information of the vehicle, determines a first candidate lane capable of autonomous driving based on a lane width of a diverging lane and an inter-lane distance when there is at least one diverging lane, and generates the autonomous driving route based on the first candidate lane.

The controller may determine a distance between points where a line segment in a direction perpendicular to a driving direction of the vehicle intersects two adjacent lanes as the lane width.

The controller may determine, as the inter-lane distance, a length of a line segment having a smallest angle $\theta$ between a line segment and a center line of the diverging lane among a plurality of line segments respectively connecting the diverging point, at which the diverging lane starts to diverge, and lanes.

The controller may determine, as the first candidate lane capable of autonomous driving, at least one diverging lane having a width that is greater than a first reference value and an inter-lane distance that is greater than a second reference value greater than the first reference value based on road information within a predetermined distance range from the diverging point.

The controller may extract road information based on a map, generate an autonomous driving lane by extending the first candidate lane based on the road information, and calculate an autonomous driving lane distance.

The controller may select a lane having a maximum autonomous driving lane distance.

The controller may select a lane with a smallest road curvature in a diverging section when there is more than one lane with the maximum autonomous driving lane distance.

The controller may generate the autonomous driving route based on the selected lane when it is determined that the selected lane is a last lane in the operational design domain.

The controller may output a guide message requesting switching of driving control to a driver when it is determined that the vehicle is not located within the operational design domain based on the location information of the vehicle.

The controller may output a guidance message requesting switching of driving control to a driver when the first candidate lane capable of autonomous driving is not determined.

According to an embodiment of the present disclosure, a vehicle control method includes generating an autonomous driving route based on surrounding information of a vehicle when it is determined that the vehicle is located within an operational design domain based on location information of the vehicle, determining a first candidate lane capable of autonomous driving based on a lane width of the diverging lane and an inter-lane distance when there is at least one diverging lane, and generating the autonomous driving route based on the first candidate lane.

The vehicle control method may further include determining, as the lane width, a distance between points where a line segment in a direction perpendicular to a driving direction of the vehicle intersects two adjacent lanes.

The vehicle control method may further include determining, as the inter-lane distance, a length of a line segment having a smallest angle $\theta$ between a line segment and a center line of the diverging lane among a plurality of line segments respectively connecting the diverging point, at which the diverging lane starts to diverge, and lanes.

The vehicle control method may further include determining, as the first candidate lane capable of autonomous driving, at least one diverging lane having a width that is greater than a first reference value and an inter-lane distance that is greater than a second reference value greater than the first reference value based on road information within a predetermined distance range from the diverging point.

The vehicle control method may further include extracting road information based on a map, generating an autonomous driving lane by extending the first candidate lane based on the road information, and calculating an autonomous driving lane distance.

The vehicle control method may further include selecting a lane having a maximum autonomous driving lane distance.

The vehicle control method may further include selecting a lane with a smallest road curvature in a diverging section when there is more than one lane with the maximum autonomous driving lane distance.

The vehicle control method may further include generating the autonomous driving route based on the selected lane when it is determined that the selected lane is a last lane in the operational design domain.

The vehicle control method may further include outputting a guide message requesting switching of driving control to a driver when it is determined that the vehicle is not located within the operational design domain based on the location information of the vehicle.

The vehicle control method may further include outputting a guidance message requesting switching of driving control to a driver when the first candidate lane capable of autonomous driving is not determined.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
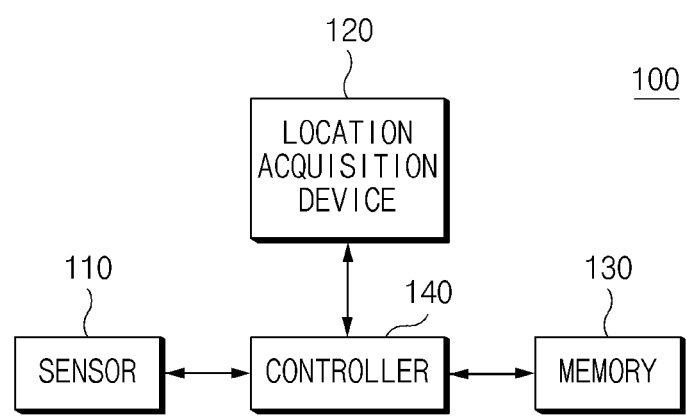
FIG. 1 is a diagram illustrating a configuration of a vehicle control apparatus according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when it is displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating a configuration of a vehicle control apparatus according to an embodiment of the present disclosure.

Referring to FIG. 1, a vehicle control apparatus 100 may include a sensor no, a location acquisition device 120, a memory (i.e., storage) 130, and a controller 140.

The sensor no may acquire vehicle surrounding information. According to an embodiment, the sensor no may detect a vehicle around a host vehicle, a road, a stationary object including a structure or the like installed around the road, a vehicle approaching from an opposite lane, or the like. It is possible to acquire ground information or lane information of a road by detecting a signal reflected from the lane marking or ground of the road. According to an embodiment, the vehicle may include a radar or a light detection and ranging (lidar).

The location acquisition device 120 may include a GPS receiver to acquire current location information of the vehicle and provide a map image for a predetermined area based on the current location of the vehicle. According to an embodiment, the location acquisition device 120 may include a separate output device, and provide various types of information related to map information visually and audibly. According to an embodiment, the output device may include a display device and a sound output device. According to an embodiment of the present disclosure, the location acquisition device 120 may be implemented as a navigation system.

The memory 130 may store a precision map including lane information and road boundary information. Further, the memory 130 may store at least one algorithm for performing operations or execution of various commands for the operation of the vehicle control apparatus according to an embodiment of the present disclosure. The memory 130 may include at least one medium of a flash memory, a hard disk, a memory card, a Read-Only Memory (rom), a Random Access Memory (ram), an Electrically Erasable Programmable Read-Only Memory (eeprom), a Programmable Read-Only Memory (prom), a magnetic memory, a magnetic disk, and an optical disk.

The controller 140 may be implemented by various processing devices such as a microprocessor incorporating a semiconductor chip capable of operating or executing various instructions or the like and may control an operation of the vehicle control apparatus according to an embodiment of the present disclosure.

The controller 140 may acquire current location information of the vehicle and determine whether the vehicle is located in an operational design domain based on the current location information. Here, the operational design domain may include a road area designed to enable autonomous driving. According to an embodiment, the operational design domain may include a highway, a motorway, a highway interchange, a highway junction, a toll gate, an entrance road to a service area, an extinction lane, a variable lane, a bus lane, and the like.

When it is determined that the vehicle is located in the operational design domain, the controller 140 may generate an autonomous driving route based on information acquired by the sensor no and the precision map stored in the memory 130. According to an embodiment, the controller 140 may sequentially receive information of the precision map within a range of 2 km to 3 km ahead from the current location of the vehicle, and generate an autonomous driving route based on road information included in the information of the precision map.

On the other hand, when it is determined that the vehicle is not located within the operational design domain, the controller 140 may determine that the autonomous driving of the vehicle is hard and output a guidance message requesting switching of driving control to a driver.

The controller 140 may generate an autonomous driving route. When there is a diverging lane in which a lane in the map diverges into at least two lanes, the controller 140 may determine a first candidate lane in which the vehicle is capable of driving based on the width of the diverging lane and an inter-lane distance. A more detailed description will be given with reference to FIGS. 2 to 5.

Figure 2:
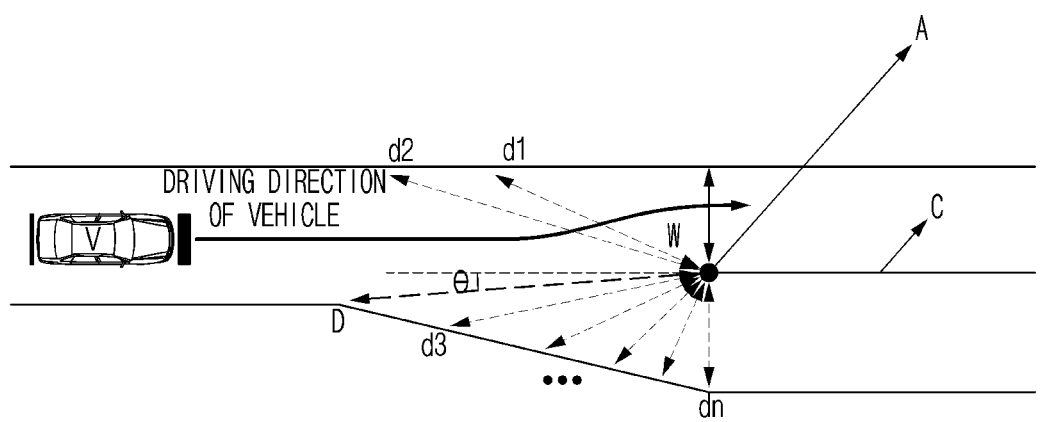
FIGS. 2 to 4 are diagrams schematically illustrating a lane width and an inter-lane distance according to an embodiment of the present disclosure.
Figure 3:
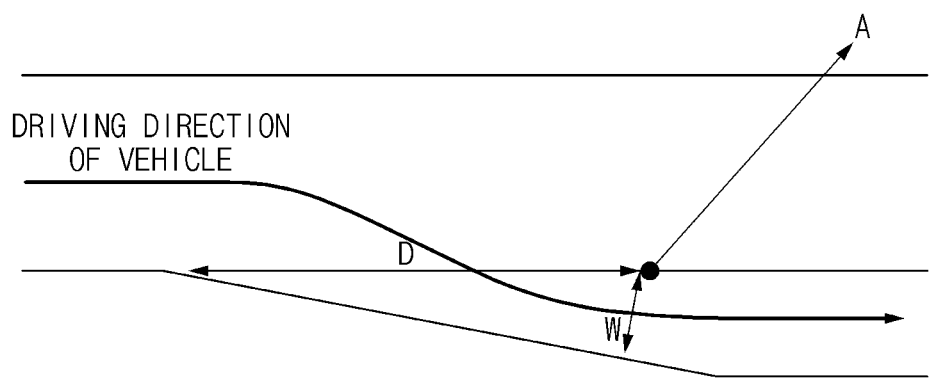
Figure 4:
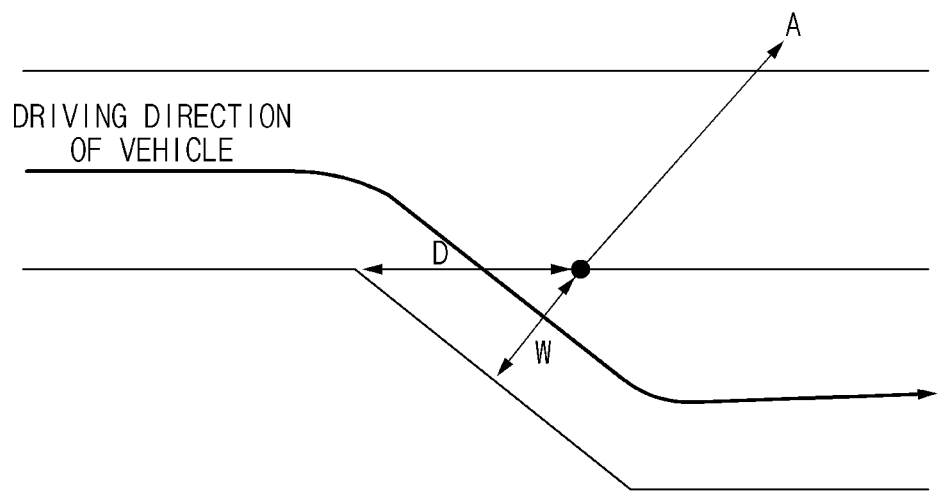
Figure 5:
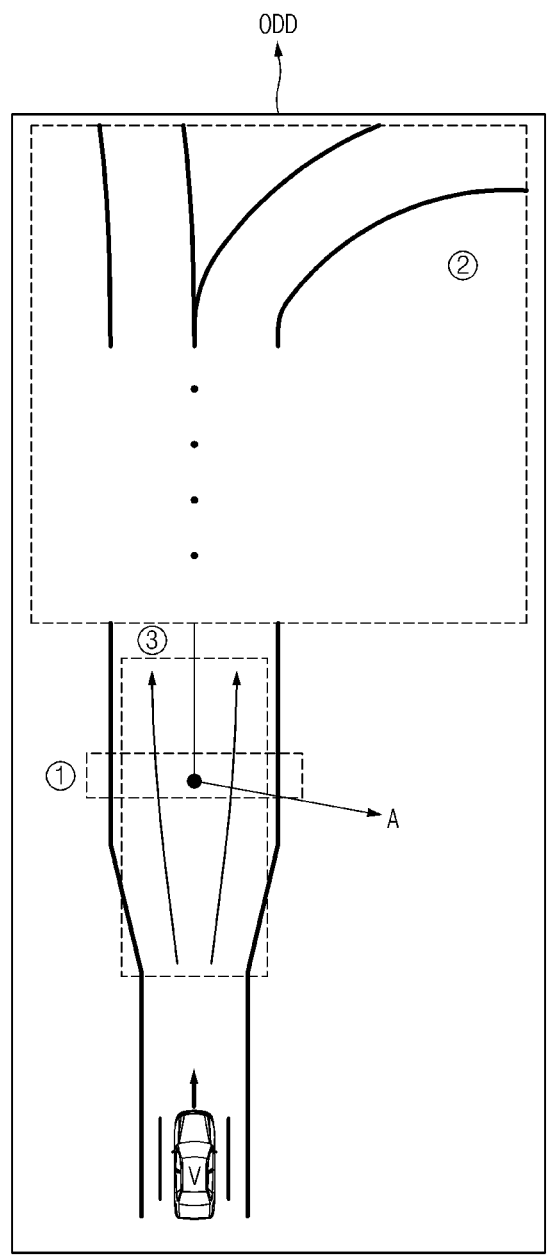
FIG. 5 is a diagram schematically illustrating a method of setting an autonomous driving path according to an embodiment of the present disclosure.

FIGS. 2 to 4 are diagrams schematically illustrating a lane width and an inter-lane distance according to an embodiment of the present disclosure, and FIG. 5 is a diagram schematically illustrating a method of setting an autonomous driving path according to an embodiment of the present disclosure.

Referring to FIG. 2, the controller 140 may determine a distance between points where a line segment in a direction perpendicular to the driving direction of the vehicle "V" intersects two adjacent lanes as a lane width "W".

In addition, among a plurality of line segments d1, d2, d3, . . . , dn respectively connecting a diverging point "A", at which the diverging lane starts to diverge, and lanes, the controller 140 may determine, as an inter-lane distance, a length (e.g., D) of a line segment having the smallest angle θ between the line segment and a center line "C" of the diverging lane.

The controller 140 may determine, as a first candidate lane capable of autonomous driving, at least one diverging lane having a width greater than a first reference value (e.g., 2.5 m), and a distance between lanes is a second reference value (e.g., 125 m) greater than the first reference value based on the road information within a predetermined distance range from the diverging point "A" based on the map (see ① in FIG. 5).

However, when the width "W" of a lane is less than or equal to the first reference value as shown in FIG. 3, or the inter-lane distance "D" is less than or equal to the second reference value as shown in FIG. 4 among diverging lanes, the controller 140 may determine that the width of the autonomous driving lane or the inter-lane distance is not secured. Accordingly, the controller 140 may determine that the autonomous driving route cannot be generated in a lane in which the width "W" of the lane is less than or equal to the first reference value or the distance "D" between lanes is less than or equal to the second reference value.

The controller 140 may determine that the autonomous driving route cannot be generated in the diverging lane when a lane width of each of all lanes which diverge at the diverging point is less than or equal to the first reference value or the inter-lane distance is less than or equal to the second reference value. In addition, when it is determined that road information within a predetermined distance range has not been acquired based on the map, the controller 140 may determine that the autonomous driving route cannot be generated.

As described above, when it is determined that the autonomous driving route cannot be generated because the width of the lane or inter-lane distance is not secured with respect to all of the diverging lanes or the road information has not been acquired within the predetermined distance range, the controller 140 cannot determine the diverging lane as the first candidate lane capable of autonomous driving. Accordingly, the controller 140 may determine that autonomous driving is hard in the diverging lane, and may output a guide message requesting switching driving control to a driver.

The controller 140 may extract road information based on the map, extend the first candidate lane to generate an autonomous driving lane, and calculate a maximum autonomous driving lane distance (see ② in FIG. 5).

The controller 140 may select a lane having the maximum autonomous driving lane distance. When there is more than one lane with the maximum autonomous driving lane distance, the controller 140 may determine the curvature of a road in a diverging section and select the lane having the smallest road curvature in the diverging section. Here, the diverging section may include a section from a point where the width between adjacent lanes of the lane in which the vehicle "V" is traveling increase to a point (③ in FIG. 5) spaced apart from the junction "A" by a predetermined distance in the driving direction of the vehicle.

The controller 140 may determine whether a selected lane is the last lane within the operational design domain. When it is determined that the selected lane is the last lane within the operational design domain, the controller 140 may generate an autonomous driving route based on the selected lane.

Meanwhile, when the controller 140 determines that the selected lane is not the last lane within the operational design domain, the controller 140 may extend and generate an autonomous driving route based on the information acquired by the sensor no and the precision map.

Figure 6:
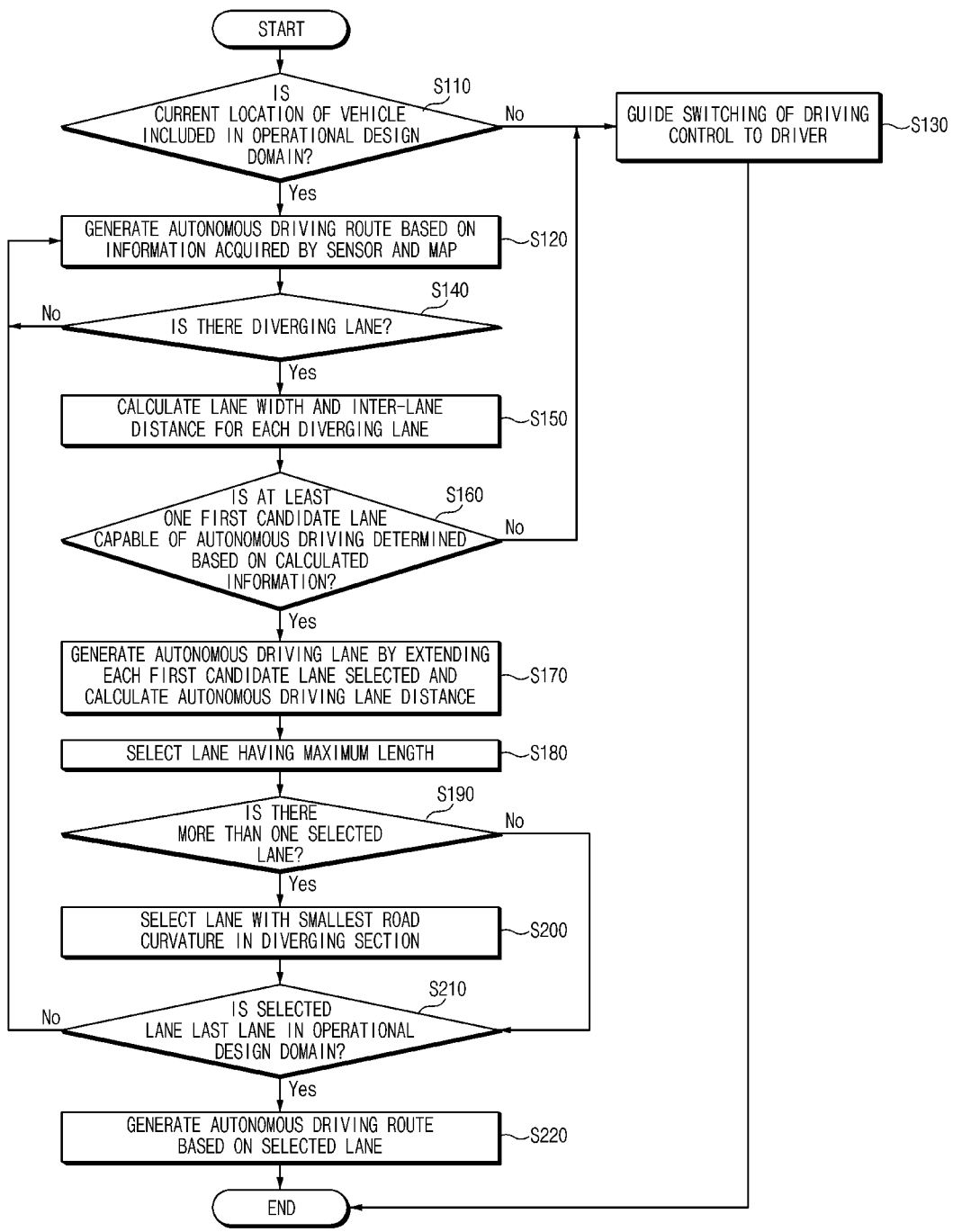
FIG. 6 is a flowchart illustrating a vehicle control method according to an embodiment of the present disclosure.

FIG. 6 is a flowchart illustrating a vehicle control method according to an embodiment of the present disclosure.

Referring to FIG. 6, the controller 140 may acquire current location information of a vehicle and determine whether the vehicle is located in an operational design domain based on the current location information (S110). Here, the operational design domain may include a road area designed to enable autonomous driving. According to an embodiment, the operational design domain may include a highway, a motorway, a highway interchange, a highway junction, a toll gate, an entrance road to a service area, an extinction lane, a variable lane, a bus lane, and the like.

When it is determined that the vehicle is located in the operational design domain in S110 (Yes), the controller 140 may generate an autonomous driving route based on information acquired by the sensor 110 and the precision map stored in the memory 130 (S120). According to an embodiment, the controller 140 may sequentially receive information of the precision map within a range of 2 km to 3 km ahead from the current location of the vehicle, and generate an autonomous driving route based on road information included in the information of the precision map in S120.

Meanwhile, when it is determined that the vehicle is not located within the operational design domain in S110 (No), the controller 140 may determine that the autonomous driving of the vehicle is hard, and output a guide message requesting switching of driving control to a driver (S130).

The controller 140 may generate an autonomous driving route, and determine whether there is a diverging lane in which a lane in the map is divided into at least two lanes (S140).

When it is determined in S140 that there is a diverging lane in the map, the controller 140 may calculate a width of the diverging lane and a distance between lanes (S150).

In S150, the controller 140 may determine a distance between points where a line segment in a direction perpendicular to the driving direction of the vehicle "V" intersects two adjacent lanes as the width "W" of the lane (see FIG. 2). In addition, among a plurality of line segments d1, d2, d3, . . . , dn respectively connecting a diverging point "A", at which the diverging lane starts to diverge, and lanes, the controller 140 may determine a length (e.g., D) of a line segment having the smallest angle θ between the diverging point "A" and a center line "C" of the diverging lane as a distance between lanes.

The controller 140 may determine whether at least one first candidate lane capable of autonomous driving is determined based on a width of the lane and a distance between lanes (S160).

In S160, the controller 140 may determine, as a first candidate lane capable of autonomous driving, at least one diverging lane having a width that is greater than a first reference value (e.g., 2.5 m) and an inter-lane distance that is greater than a second reference value (e.g., 125 m) greater than the first reference value based on the road information within a predetermined distance range from the diverging point "A" based on the map (see ① in FIG. 5).

Meanwhile, when it is determined in S160 that the width of the diverging lane is equal to or less than the first reference value as shown in FIG. 3, or the inter-lane distance is less than or equal to the second reference value as shown in FIG. 4, the controller 140 may determine that the width of the lane or inter-lane distance is not secured, and the autonomous driving route cannot be created in a lane in which the width (W) of the lane is less than the first reference value or the inter-lane distance (D) is less than or equal to the second reference value.

In addition, when it is determined in S160 that road information within a predetermined distance range has not been acquired based on the map, the controller 140 may determine that the autonomous driving route cannot be generated.

When it is determined in S160 that the autonomous driving route cannot be generated because the width of the lane or the inter-lane distance is not secured with respect to all of the diverging lanes or the road information has not been acquired within the predetermined distance range, the controller 140 cannot determine the diverging lane as the first candidate lane capable of autonomous driving. Accordingly, the controller 140 may determine that autonomous driving is hard in all diverging lanes, and may output a guide message requesting switching driving control to a driver (S130).

When the first candidate lane is determined, the controller 140 may extract road information based on the map, extend the first candidate lane to generate an autonomous driving lane, and calculate an autonomous driving lane distance (S170).

The controller 140 may select a lane having the maximum autonomous driving lane distance (S180).

The controller 140 may determine whether there is more than one lane having the maximum autonomous driving lane distance (S190).

When it is determined in S190 that there is more than one lane with the maximum autonomous driving lane distance, the controller 140 may determine the curvature of a road in a diverging section and select the lane having the smallest road curvature in the diverging section (S200). Here, the diverging section may include a section from a point where the width between adjacent lanes of the lane in which the vehicle "V" is traveling increase to a point spaced apart from the junction "A" by a predetermined distance in the driving direction of the vehicle. Meanwhile, when it is determined in S190 that there is not more than one lane having the maximum autonomous driving lane distance, the controller 140 may perform S210.

The controller 140 may determine whether the selected lane is the last lane within the operational design domain (S210). The selected lane may include any one of a lane having the maximum autonomous driving lane distance and a lane having the smallest road curvature in the diverging section.

When it is determined in S210 that the selected lane is the last lane in the operational design domain, the controller 140 may generate an autonomous driving route based on the selected lane (S220).

Meanwhile, when it is determined in S210 that the selected lane is not the last lane within the operational design domain, the controller 140 may again perform S120 to extend and generate the autonomous driving route based on the information acquired by the sensor 110 and the precision map.

Figure 7:
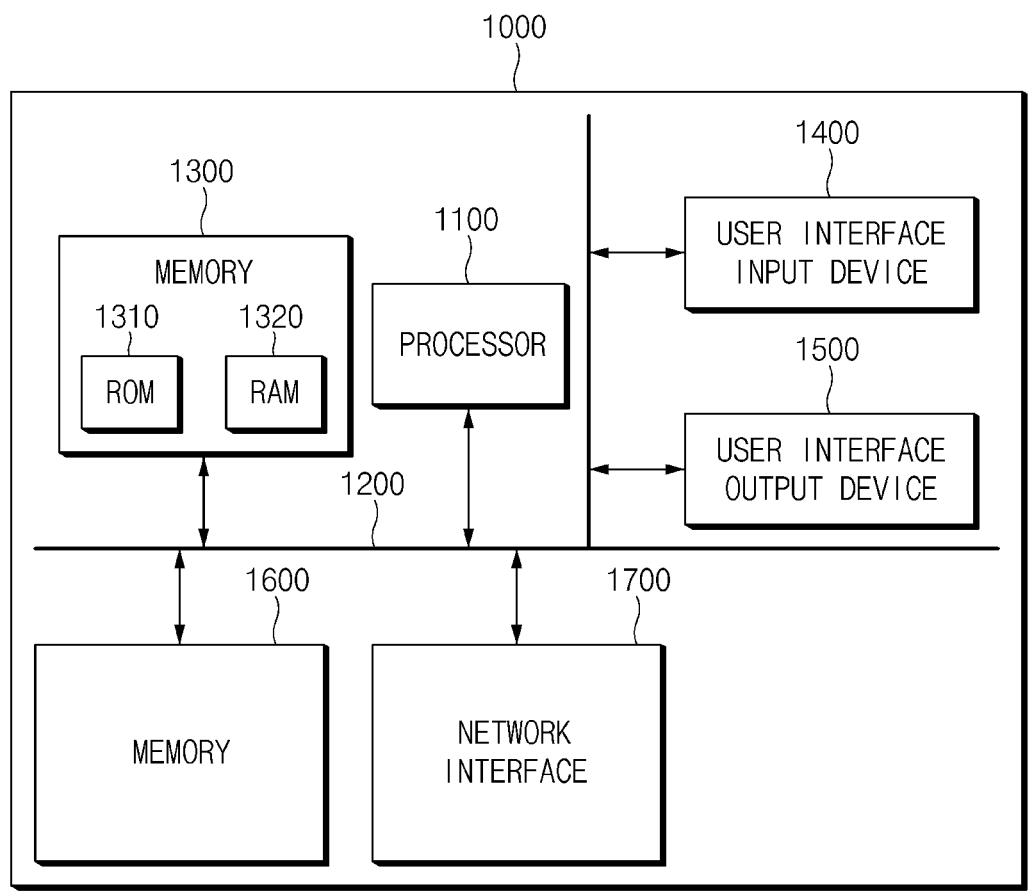
FIG. 7 is a diagram showing a configuration of a computing system for executing a method according to an embodiment of the present disclosure.

FIG. 7 is a diagram showing a configuration of a computing system for executing a method according to an embodiment of the present disclosure.

Referring to FIG. 7, a computing system 1000 may include at least one processor 1100, a memory 1300, a user interface input device 1400, a user interface output device 1500, a memory (i.e., storage) 1600, and a network interface 1700, which are connected with each other via a bus 1200.

The processor 1100 may be a central processing unit (cpu) or a semiconductor device that processes instructions stored in the memory 1300 and/or the memory 1600. The memory 1300 and the memory 1600 may include various types of volatile or non-volatile storage media. For example, the memory 1300 may include a ROM (Read Only Memory) 1310 and a RAM (Random Access Memory) 1320.

Thus, the operations of the methods or the algorithms described in connection with the embodiments disclosed herein may be embodied directly in hardware or a software module executed by the processor 1100, or in a combination thereof. The software module may reside on a storage medium (that is, the memory 1300 and/or the memory 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (asic). The ASIC may reside within a user terminal. In another case, the processor and the storage medium may reside in the user terminal as separate components.

The above description is merely illustrative of the technical idea of embodiments of the present disclosure, and various modifications and variations may be made without departing from the essential characteristics of the present disclosure by those skilled in the art to which the present disclosure pertains.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

The vehicle control apparatus and the vehicle control method according to the embodiments of the present disclosure provide an effect of securing driving stability and driving continuity of an autonomous vehicle by generating an autonomous driving route in a diverging lane within an operational design domain.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a vehicle, the apparatus comprising:
   a sensor;
   a location acquisition device; and
   a controller configured to:
      generate a first autonomous driving route based on surrounding information of the vehicle received by the sensor and location information of the vehicle received by the location acquisition device and based on determining that the vehicle is located within an operational design domain;
      determine that there is a diverging lane;
      determine a first candidate lane capable for autonomous driving based on a lane width and an inter-lane distance of the diverging lane;
      generate a second autonomous driving route based on the first candidate lane and the first autonomous driving route;
      determine that the second autonomous driving route cannot be generated based on road information within a predetermined distance range from a diverging point of the diverging lane;
      determine that the second autonomous driving route cannot be generated based on determining that the lane width of the diverging lane is less than or equal to a first reference value and the inter-lane distance is less than or equal to a second reference value; and
      output a guidance message requesting switching a driving control of the vehicle to a driver based on determining that the second autonomous driving route cannot be generated.

2. The apparatus of claim 1, wherein the controller is configured to determine, as the lane width, a distance between points where a line segment in a direction perpendicular to a driving direction of the vehicle intersects two adjacent lanes.

3. The apparatus of claim 1, wherein the controller is configured to determine the inter-lane distance by:
   determine a reference line by extending a center line backwards from the diverging point in a direction opposite to a driving direction of the vehicle;
   determine line segments from the diverging point to each candidate lane;
   determine angles between the reference line and each line segment;
   determine a line segment that forms a smallest angle with the reference line; and
   determine a length of the determined line segment as the inter-lane distance.

4. The apparatus of claim 3, wherein the controller is configured to determine, as the first candidate lane capable of autonomous driving, the diverging lane having the lane width that is greater than the first reference value and the inter-lane distance that is greater than the second reference value based on the road information within the predetermined distance range from the diverging point.

5. The apparatus of claim 1, wherein the controller is configured to:
   extract road information based on a map,
   generate the second autonomous driving route based on the road information of the first candidate lane, and
   calculate an autonomous driving lane distance, wherein the autonomous driving lane distance includes a distance representing a maximum distance the vehicle is able to travel autonomously along the first candidate lane.

6. The apparatus of claim 5, wherein the controller is configured to select a lane having a maximum autonomous driving lane distance.

7. The apparatus of claim 6, wherein the controller is configured to select a lane with a smallest road curvature in a diverging section when there is more than one lane with the maximum autonomous driving lane distance.

8. The apparatus of claim 1, wherein the controller is configured to generate the second autonomous driving route based on a selected lane, and wherein the selected lane is a lane that remains within the operational design domain.

9. The apparatus of claim 1, wherein the controller is configured to output the guidance message requesting switching the driving control to the driver based on determining that the vehicle is not located within the operational design domain based on the location information of the vehicle.

10. The apparatus of claim 1, wherein the controller is configured to output the guidance message requesting switching the driving control to the driver based on determining that the first candidate lane is not capable for autonomous driving.

11. A method for controlling a vehicle, the method comprising:
   generating, by a controller of the vehicle, a first autonomous driving route based on surrounding information of the vehicle and location information of the vehicle and based on determining that the vehicle is located within an operational design domain;
   determining, by the controller, that there is a diverging lane;
   determining, by the controller, a first candidate lane capable of autonomous driving based on a lane width of the diverging lane and an inter-lane distance of the diverging lane;
   generating, by the controller, a second autonomous driving route based on the first candidate lane and the first autonomous driving route;
   determining, by the controller, that the second autonomous driving route cannot be generated based on road information within a predetermined distance range from a diverging point of the diverging lane;
   determining, by the controller, that the second autonomous driving route cannot be generated based on determining that the lane width of the diverging lane is less than or equal to a first reference value and the inter-lane distance is less than or equal to a second reference value; and
   outputting a guidance message requesting switching driving control to a driver based on determining that the second autonomous driving route cannot be generated.

12. The method of claim 11, further comprising determining, as the lane width, a distance between points where a line segment in a direction perpendicular to a driving direction of the vehicle intersects two adjacent lanes.

13. The method of claim 11, further comprising determining the inter-lane distance by:
- determining a reference line by extending a center line backwards from the diverging point in a direction opposite to a driving direction of the vehicle;
- determining line segments from the diverging point to each candidate lane;
- determining angles between the reference line and each line segment;
- determining a line segment that forms a smallest angle with the reference line; and
- determining a length of the determined line segment as the inter-lane distance.

14. The method of claim 13, further comprising determining, as the first candidate lane capable for autonomous driving, the diverging lane having the lane width that is greater than the first reference value and the inter-lane distance that is greater than the second reference value based on the road information within the predetermined distance range from the diverging point.

15. The method of claim 11, further comprising:
- extracting road information based on a map;
- generating the second autonomous driving route based on the road information of the first candidate lane; and
- calculating an autonomous driving lane distance, wherein the autonomous driving lane distance includes a distance representing a maximum distance the vehicle is able to travel autonomously along the first candidate lane.

16. The method of claim 15, further comprising selecting a lane having a maximum autonomous driving lane distance.

17. The method of claim 16, further comprising selecting a lane with a smallest road curvature in a diverging section when there is more than one lane with the maximum autonomous driving lane distance.

18. The method of claim 15, further comprising generating the second autonomous driving route based on a selected lane wherein the selected lane is a lane that remains within the operational design domain.

19. The method of claim 11, further comprising outputting the guidance message requesting switching the driving control to the driver based on determining that the vehicle is not located within the operational design domain based on the location information of the vehicle.

20. The method of claim 11, further comprising outputting the guidance message requesting switching the driving control to the driver based on determining that the first candidate lane is not capable for autonomous driving.

* * * * *